(12) United States Patent
Walacavage et al.

(10) Patent No.: US 7,346,478 B2
(45) Date of Patent: Mar. 18, 2008

(54) METHOD OF EMBEDDING TOOLING CONTROL DATA WITHIN MECHANICAL FIXTURE DESIGN TO ENABLE PROGRAMMABLE LOGIC CONTROL VERIFICATION SIMULATION

(75) Inventors: Joe Walacavage, Ypsilanti, MI (US); Alan Baumgartner, Livonia, MI (US); Scott Kennedy, Warren, MI (US); Shanker Ganti, Canton, MI (US); Eric Newman, Brighton, MI (US)

(73) Assignee: Ford Motor Company, Dearborn, MI (US)

(*) Notice: Subject to any disclaimer, the term of this patent is extended or adjusted under 35 U.S.C. 154(b) by 328 days.

(21) Appl. No.: 10/946,233

(22) Filed: Sep. 21, 2004

(65) Prior Publication Data

US 2006/0064289 A1 Mar. 23, 2006

(51) Int. Cl.
*G06F 9/455* (2006.01)
(52) U.S. Cl. .............................. 703/7; 703/26; 703/13; 700/105; 700/32; 700/97; 700/165
(58) Field of Classification Search .................... 703/7, 703/26, 13; 700/105, 32, 97, 165, 96; 425/470; 706/62; 345/653; 433/24
See application file for complete search history.

(56) References Cited

U.S. PATENT DOCUMENTS

| | | | |
|---|---|---|---|
| 4,510,565 A | 4/1985 | Dummermuth | |
| 4,928,221 A | 5/1990 | Belkhiter | |
| 4,931,951 A | 6/1990 | Murai et al. | |
| 4,998,206 A | 3/1991 | Jones et al. | |
| 5,050,088 A | 9/1991 | Buckler et al. | |
| 5,106,290 A * | 4/1992 | Carver et al. | 425/470 |
| 5,249,135 A | 9/1993 | Fujita | |
| 5,377,116 A | 12/1994 | Wayne et al. | |
| 5,377,315 A | 12/1994 | Leggett | |
| 5,388,051 A | 2/1995 | Seki et al. | |
| 5,402,349 A | 3/1995 | Fujita et al. | |
| 5,574,637 A | 11/1996 | Obata et al. | |
| 5,644,493 A | 7/1997 | Motai et al. | |

(Continued)

FOREIGN PATENT DOCUMENTS

EP 0 508 308 A3 4/1992

OTHER PUBLICATIONS

Beck et al, "Applying a Component-Based Software Architecture to Robotic Workcell Applications". IEEE Transactions on Robotics and Automation, vol. 16, No. 3, Jun. 2000.*

(Continued)

*Primary Examiner*—Paul Rodriguez
*Assistant Examiner*—Kandasamy Thangavelu
(74) *Attorney, Agent, or Firm*—Gary A. Smith; Bliss McGlynn, P.C.

(57) ABSTRACT

A method is provided of embedding tooling control data within a mechanical fixture design to enable programmable logic control verification simulation. The method includes the steps of constructing at least one of a mechanical fixture design, a workcell design, and a controls design. The method also includes the steps of executing a virtual programmable logic control (VPLC) simulation with a VPLC verification simulator to verify the at least one of the mechanical fixture design, the workcell design, and the controls design.

28 Claims, 3 Drawing Sheets

U.S. PATENT DOCUMENTS

| | | | |
|---|---|---|---|
| 5,691,711 A | | 11/1997 | Jorgensen |
| 5,758,123 A | * | 5/1998 | Sano et al. .................. 703/22 |
| 5,796,618 A | | 8/1998 | Maeda et al. |
| 5,963,447 A | | 10/1999 | Kohn et al. |
| 5,991,533 A | | 11/1999 | Sano et al. |
| 6,167,406 A | | 12/2000 | Hoskins et al. |
| 6,185,469 B1 | | 2/2001 | Lewis et al. |
| 6,223,134 B1 | | 4/2001 | Rust et al. |
| 6,263,487 B1 | | 7/2001 | Stripf et al. |
| 6,292,707 B1 | | 9/2001 | Hair et al. |
| 6,292,715 B1 | * | 9/2001 | Rongo ....................... 700/249 |
| 6,442,441 B1 | | 8/2002 | Walacavage et al. |
| 6,470,301 B1 | | 10/2002 | Barral |
| 6,526,373 B1 | | 2/2003 | Barral |
| 6,741,898 B2 | * | 5/2004 | Baumgartner et al. ........ 700/96 |
| 6,847,922 B1 | | 1/2005 | Wampler, II |
| 6,928,337 B2 | | 8/2005 | Watanabe et al. |
| 2002/0193972 A1 | | 12/2002 | Kudo et al. |
| 2003/0018405 A1 | * | 1/2003 | Walacavage et al. ....... 700/105 |
| 2003/0045947 A1 | | 3/2003 | Wampler |
| 2003/0074170 A1 | | 4/2003 | Watanabe et al. |
| 2004/0019402 A1 | * | 1/2004 | Bourne et al. ............. 700/165 |
| 2004/0117166 A1 | * | 6/2004 | Cassiolato .................. 703/13 |
| 2004/0128120 A1 | * | 7/2004 | Coburn et al. ............... 703/26 |
| 2004/0246440 A1 | * | 12/2004 | Andino et al. .............. 351/177 |
| 2004/0265770 A1 | * | 12/2004 | Chapoulaud et al. ......... 433/24 |
| 2005/0080502 A1 | * | 4/2005 | Chernyak et al. ............ 700/97 |
| 2005/0132306 A1 | * | 6/2005 | Smith et al. .................. 716/1 |
| 2006/0152533 A1 | * | 7/2006 | Read .......................... 345/653 |
| 2006/0224546 A1 | * | 10/2006 | Ballin et al. .................. 706/62 |
| 2006/0229742 A1 | * | 10/2006 | Boutin et al. ................ 700/32 |

OTHER PUBLICATIONS

Frey et al, "Formal Methods in PLC Programming", IEEE International Conference on Systems, Man and Cybernetics, Nashville, Tennessee, Oct. 2000.*

Ledue, Ryan James, "PLC Implementation of a DES Supervisor for a Manufacturing Testbed: An Implementation Perspective", Thesis submittal, Graduate Department of Computer and Electrical Engineering, University of Toronto, 1996, pp. i-xv, 50-51, 129-143, obtained via http://www.cas.mcmaster.ca/~leduc/rleduc-masc.pdf.*

S. Kanai, T. Kishinami, "A Virtual Verification Environment for the Sequence Control System Using VRML and JAVA," 1999 by ASME, pp. 1-8.

"ThermaView Advanced Welder Diagnostics System," 1998.

S. Vedapudi, "Using MCM to do Emulation of a Car Assembly Line", Brooks Automation Symposium, 2001, pp. 1-4.

W. Dong, F. Palmquist, and S. Lidholm, "A Simple and Effective Emulation Tool Interface Development for Tricept Application", Proceedings of the 33rd ISR, Oct. 7-11, 2002, 4 pages.

Lee Schruben, "Simulation Modeling with Event Graphs", 1983, ACM, Communications of the ACM, vol. 26, No. 11, pp. 957-963.

Tyler Phillips, "AUTOMOD™ by AUTOSIMULATIONS", 1998, Proceedings of the 1998 Winter Simulation Conference, pp. 213-218.

Diedra L. Donald, "A Tutorial on Ergonomic and Process Modeling Using Quest and IGRIP", 1998, Proceedings of the 1998 Winter Simulation Conference, pp. 297-302.

Jerry Banks, ed., "Handbook of Simulation", 1998, John Wiley & Sons, pp. 519-545.

Matthew Rohrer, "Automod Product Suite Tutorial (Automod, Simulator, AutoSat) by AUTOSIMULATIONS", Proceeding of the 1999 Winter Simulation Conference, pp. 220-226.

Fernando Gonzalez, "A Simulation-Based Controller Builder for Flexible Manufacturing Systems", 1996, Proceedings of the 1996 Winter Simulation Conference, pp. 1068-1075.

Fernando Gonzalez and Wayne Davis, "A Simulation-Based Controller Distributed Discrete-Event Systems with Application to Flexible Manufacturing", 1997, Proceedings of the 1997 Winter Simulation Conference, pp. 845-852.

Cynthia Erickson et al., "Simulation, Animation, and Shop-Floor Control", 1987, Proceedings of the 1987 Winter Simulation Conference, pp. 649-653.

B. F. Boczkaj, Software Aspects of PLCs Application in Robotic Workcells, 1996 IEEE.

P. Petruska, J. N. Marcincin, M.Doliak, ROANS-IntelligentSimulation and Programming System for Robots and Automated Workcell, 1997.

W. Dai, M. Kampker, PIN-A PC-Based Robot Simulation and Offline Programming System Using Macro Programming Techniques, 1999 IEEE.

* cited by examiner

METHOD OF EMBEDDING TOOLING CONTROL DATA WITHIN MECHANICAL FIXTURE DESIGN TO ENABLE PROGRAMMABLE LOGIC CONTROL VERIFICATION SIMULATION

BACKGROUND OF THE INVENTION

1. Field of the Invention

The present invention relates generally to programmable logic controllers and, more specifically, to a method of embedding tooling control data within a mechanical fixture design to enable programmable logic control verification simulation.

2. Description of the Related Art

It is known that programmable logic controller (PLC) code is written by controls engineers after assembly tooling designs are completed and a manufacturing process has been defined. The creation of the programmable logic controller code is mostly a manual programming task with any automation of the code generation limited to "cutting and pasting" previously written blocks of code that were applied to similar manufacturing tools. Once the programmable logic controller code is written, it is used by a tool builder to fabricate subsequent hard tools used in the manufacture and assembly of parts for motor vehicles. The programmable logic controller code is not validated (debugged) until the hard tools are built and tried. A significant portion of this tool tryout process is associated with the debugging of the programmable logic controller code at levels of detail from a tool-by-tool level, to a workcell level, and finally at a manufacturing line level.

It is also known that a manufacturing line is typically made of three to twenty linked workcells. Each workcell consists of a tool such as a fixture to position a product, for example sheet metal, and associated automation, for example robots, that process the product, for example by welding. The workcell typically consists of a fixture/tool surrounded by three or four robots. The product is then transferred to the next workcell in the manufacturing line for further processing, until it exits the manufacturing line.

It is further known that the workcells for a manufacturing line can be modeled before the manufacturing line is implemented. Current modeling technologies, such as Robcad from Tecnomatix and Igrip from Delmia, for the manufacturing process are limited in scope to a workcell level, due to how these type of technologies represent and manipulate three dimensional data and tool motions. This scope limitation is due to the manner in which tooling geometry is defined and the manner in which tool motions are described and displayed to a user. The geometry representation is typically defined using Non-Uniform Rational BSpline (NURB) type equations, which are very exact and precise, but require intensive microprocessor calculations. The tooling and robotic motions are also microprocessor intensive in that the articulations and movements are described through the use of complex kinematic equations and solvers. Presently, there is no modeling mechanism to verify that the planned interactions between linked workcells is indeed feasible until the manufacturing line is actually fabricated and assembled on a floor of a manufacturing plant.

Therefore, it is desirable to embed tooling control data within a mechanical fixture design to enable programmable logic control verification simulation prior to tool fabrication, assembly, and tryout. It is also desirable to reduce the amount of time it takes to conduct virtual programmable logic control verification simulations. It is further desirable to increase the accuracy of virtual programmable logic control verification simulations. Therefore, there is a need in the art to provide a method of embedding tooling control data within a mechanical fixture design to enable programmable logic control verification simulation.

SUMMARY OF THE INVENTION

Accordingly, the present invention is a method of embedding tooling control data within a mechanical fixture design to enable programmable logic control verification simulation. The method includes the steps of constructing at least one of a mechanical fixture design, a workcell design, and a controls design. The method also includes the steps of executing a virtual programmable logic control (VPLC) simulation with a VPLC verification simulator to verify at least one of the mechanical fixture design, the workcell design, and the controls design.

One advantage of the present invention is that a method of embedding tooling control data within a mechanical fixture design to enable programmable logic control verification simulation is provided for use in building a manufacturing line to manufacture a motor vehicle. Another advantage of the present invention is that the method reduces the amount of time it takes to conduct virtual programmable logic control verification simulations. Yet another advantage of the present invention is that the method increases the accuracy of virtual programmable logic control verification simulations. Still another advantage of the present invention is that the method lowers the potential for loosing mechanical design assumptions related to control system design through a body shop fixture tooling design process, such as naming conventions, tooling sequence description, bill of materials for control and mechanical items, etc. A further advantage of the present invention is that the method supports effective control logic system design simulation approach by automatically producing tooling visualization data that describes the allowable tooling behavior, that is used by a virtual programmable logic controller. Yet a further advantage of the present invention is that the method exports mechanical fixture data such that all the relationships are maintained between tooling items that move (e.g., clamps, dumps, shuttles, etc.), the sequence (order) in which it is estimated that the tools need to move within the manufacturing environment, items that are structural and do not move but take up space on the floor and need to be accounted for in the virtual PLC simulation to test for possible collisions with moving tooling, and control items such as sensors, switches, actuators, which sense the position of parts and or tooling. Still a further advantage of the present invention is that the method exports fabrication information from a mechanical fixture design to support a floor build of tooling.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
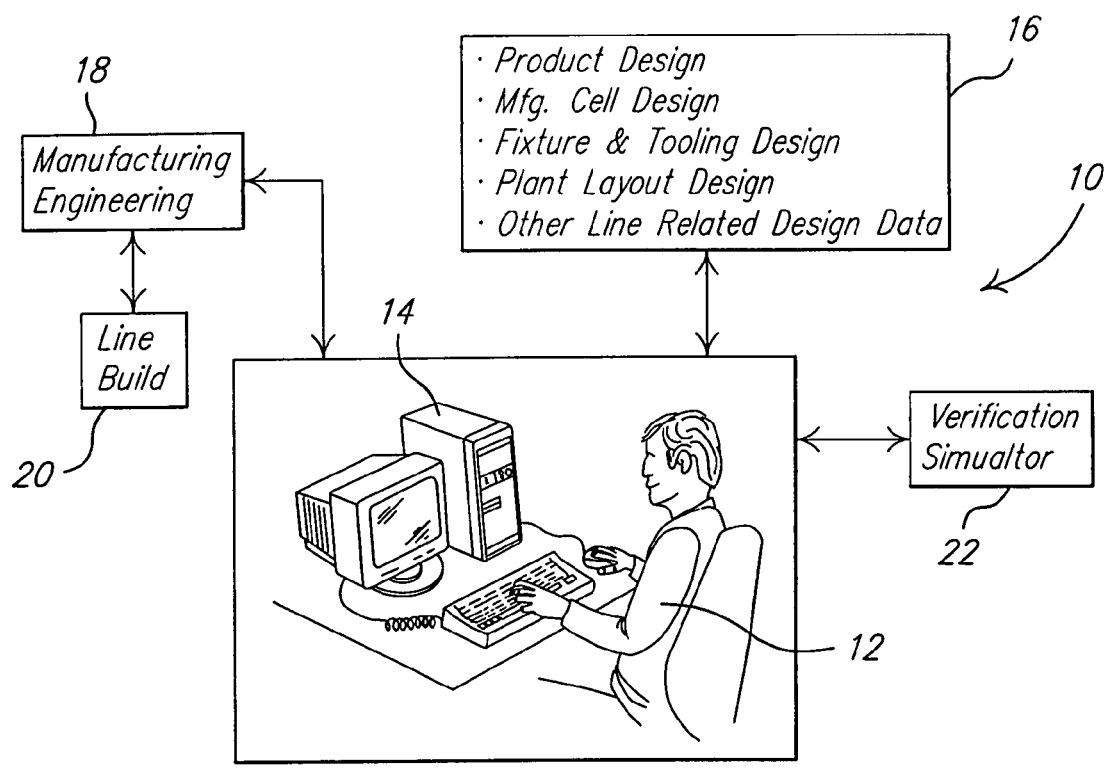
FIG. 1 is a diagrammatic view of a system, according to the present invention, for embedding tooling control data within a mechanical fixture design to enable programmable logic control verification simulation illustrated in operational relationship with an operator.

Referring to the drawings and in particular FIG. 1, one embodiment of a system 10, according to the present invention, for embedding tooling control data within a mechanical fixture design to enable programmable logic control verification simulation is illustrated. In the present invention, an operator 12 uses the system 10 to perform programmable logic control verification simulation. The system 12 includes a computer 14 to send and receive information to and from a design engineering source 16 via an electronic link. The design engineering source 16 includes a product design system, work cell design system, manufacturing cell design system, mechanical fixture and tooling design system, controls design system, plant layout design system, and other manufacturing line related design systems to provide engineering data for standard components, tools, fixture models, and robots to interact with the fixture models. These design systems have the ability to read and write in a neutral file format. It should be appreciated that the above-mentioned design systems use either a specific file format such as VLE or other neutral file formats such as XML that contain information organized in a manner that is recognized and readily useable. It should also be appreciated that the neutral file formats are conventional and known in the art.

The computer 14 also sends and receives information to and from a manufacturing engineering source 18 via an electronic link. The manufacturing engineering source 18 includes data on manufacturing engineering such as a tooling line. The manufacturing engineering source 18 also sends and receives information to and from a manufacturing line build source 20 via an electronic link. The manufacturing line build source 20 includes data for building the manufacturing line (not shown) for the manufacture of parts (not shown) for a motor vehicle (not shown). The computer 14 also sends and receives information from a programmable logic control verification simulator 22 via an electronic link to verify the PLC for the manufacturing line. The manufacturing line verification simulator 22 verifies stand-alone workcells, workcell to workcell interactions, and total manufacturing line operation. The manufacturing line build source 20 automatically generates the programmable logic controller (PLC) code, which is then used at physical tool build. An example of automatically generating PLC code for building a physical tool is disclosed in U.S. Pat. No. 6,442,441, the disclosure of which is hereby incorporated by reference. It should be appreciated that the computer 12, electronic links, and sources are conventional and known in the art.

Figure 2A:
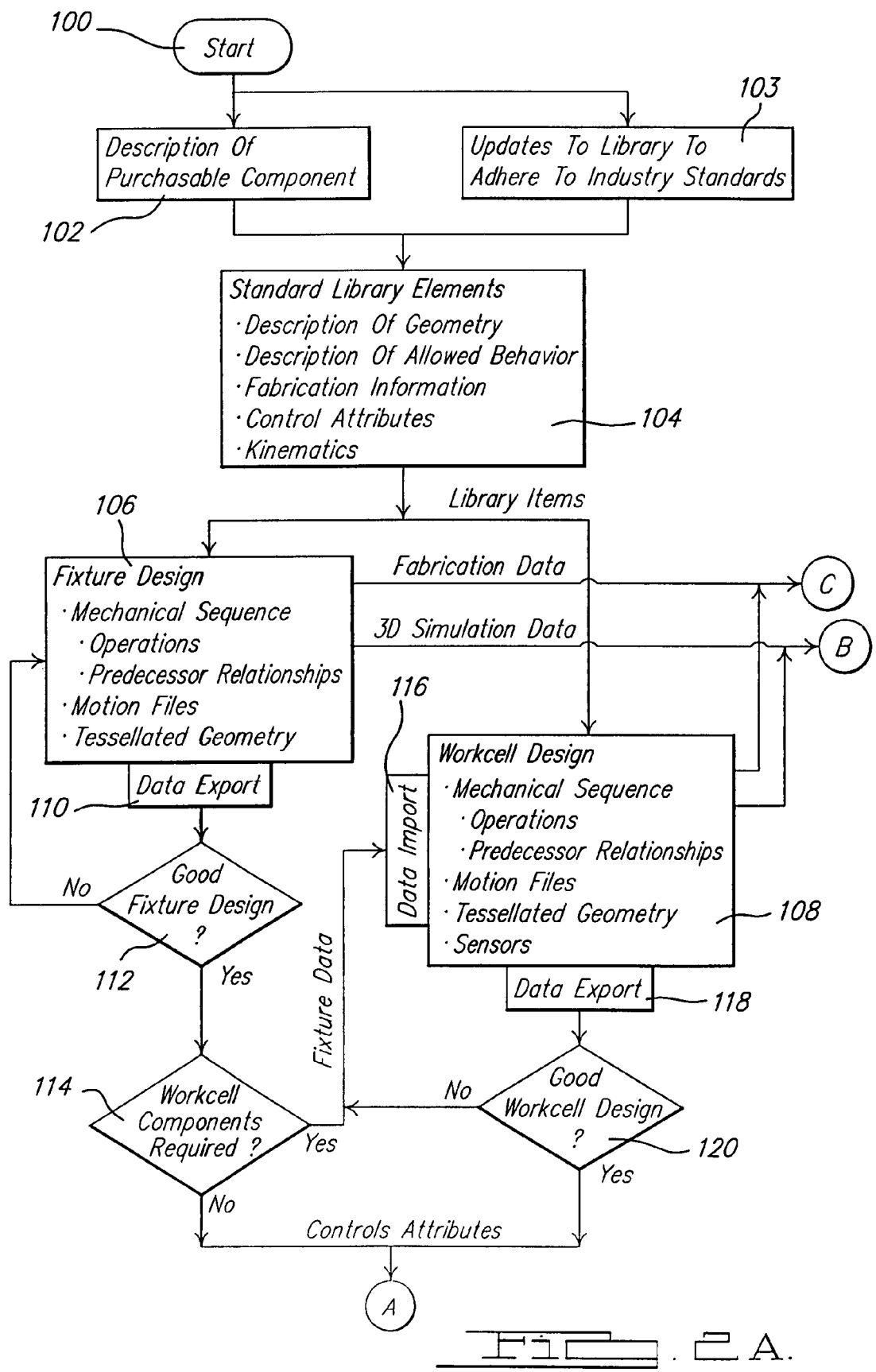
FIGS. 2A and 2B are a flowchart of a method, according to the present invention, of embedding tooling control data within a mechanical fixture design to enable programmable logic control verification simulation for the system of FIG. 1.
Figure 2B:
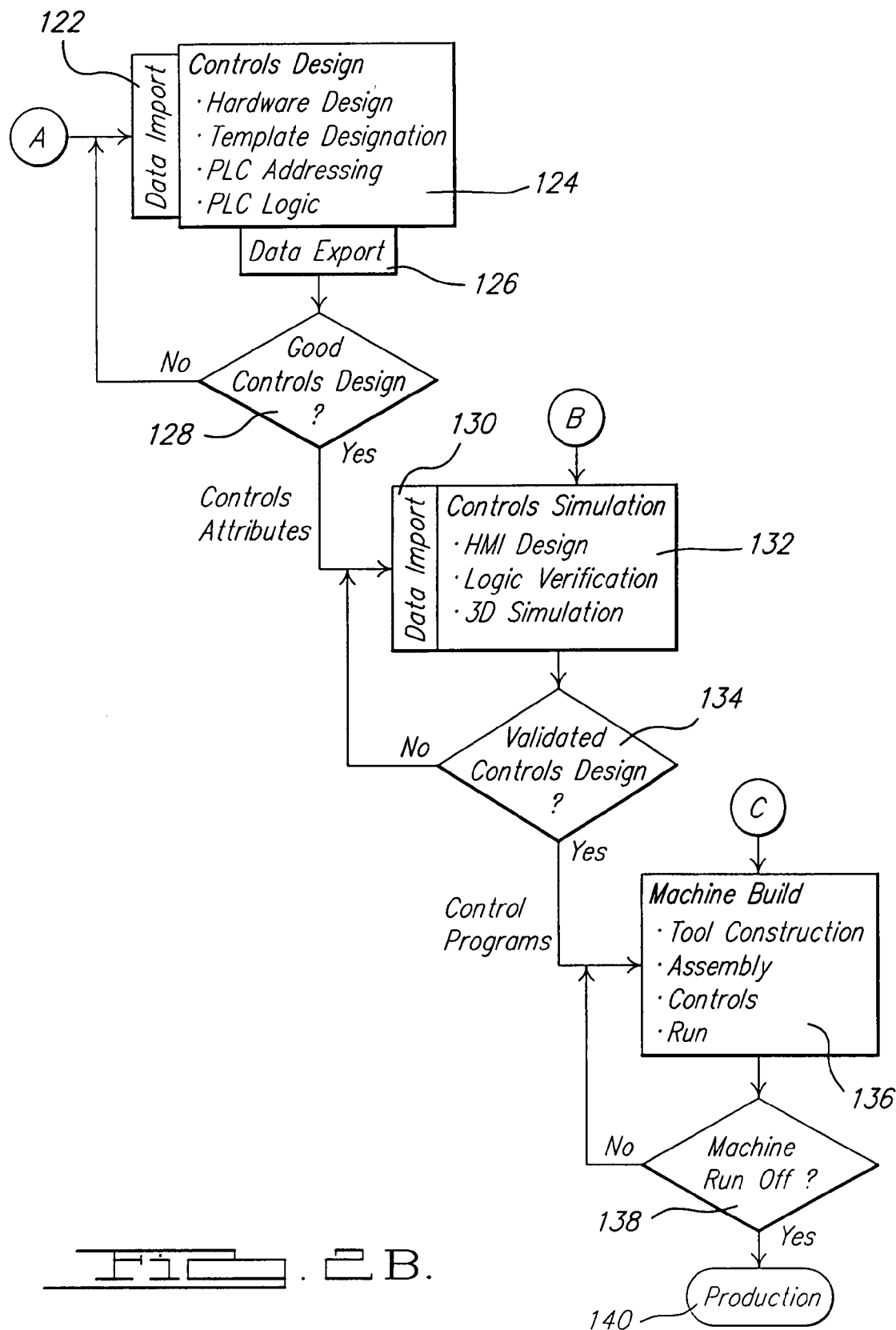

Referring to FIGS. 2A and 2B, a method, according to the present invention, of embedding tooling control data within a mechanical fixture design to enable programmable logic control verification simulation with the system 10 is shown. In general, the method embeds tooling control data within a mechanical fixture design to enable programmable logic control verification simulation of the PLC code. The method facilitates the automatic inclusion and embedding of control related data in three dimensional computer aided drafting (CAD) mechanical fixture design and exports and aligns mechanical, control, and visualization data to be readily usable by the virtual programmable logic control verification simulator 22 for control system design verification. It should be appreciated that the method is carried out on the computer 14 of the system 10 by the operator 12.

Referring to FIG. 2A, the method starts or begins in bubble 100 and advances to either block 102 or block 103. In block 102, the method receives a description of a purchasable component such as a clamp from a library in the design engineering source 16. The design engineering source 16 may include product design, manufacturing cell design, mechanical fixture and tooling design, plant layout design, and other manufacturing line related design data. The product design information may be a single part or a plurality of parts to be assembled in a manufacturing line. The manufacturing cell design information typically includes flexible automation, for example robots, material handling, etc. The fixture and tooling design information typically includes hard tooling such as a clamp. The plant layout design information typically includes location of the manufacturing line, for example location of columns, aisles, etc. The other manufacturing line design information typically includes intersection points of other manufacturing lines (where two manufacturing lines merge), location of control panels, remote valving stations, energy cabinets, and other items that take up space that potentially could interfere with tool movements and operator interactions. In block 103, the method updates a library in the design engineering source 16 to adhere to industry standards.

After block 102 or block 103, the method advances to block 104 and receives standard library elements from the design engineering source 16. The standard library elements include a description of geometry, description of allowed behavior, fabrication information, control attributes, and kinematics. After block 104, the method advances to either block 106 or 108. In block 106, the method receives information of a mechanical fixture design from the design engineering source 16. The mechanical fixture design includes mechanical sequence operations, predecessor relationships, motion files, and tessellated geometry. The method advances to block 110 and exports the information of the mechanical fixture design. The method advances to diamond 112 and determines whether the mechanical fixture design is good or acceptable. For example, the operator 12 determines whether the clamp is of the correct size and shape. If the mechanical fixture design is good, the method advances to diamond 114 to be described.

In diamond 112, if the mechanical fixture design is not good or correct, the method returns to block 106, previously described, to adjust the description of the mechanical fixture design by the fixture design system in the design engineering source 16. The method then advances to block 110 previously described. It should be appreciated that the information is imported and exported from the systems within the design engineering source 16.

In diamond 114, the method determines whether workcell components are required. For example, the operator 12 determines whether a robot is needed to interact with the workpiece. If workcell components are required, the method advances to block 116 and imports the data of the mechanical fixture design for block 108. In block 108, the method receives information of the mechanical fixture design and selects the workcell design from the design engineering source 16. The workcell design includes mechanical sequence operations, predecessor relationships, motion files, tessellated geometry, and sensors. The method advances to block 118 and exports the information of the workcell design. The method then advances to diamond 120 and determines whether the workcell design is good or acceptable. For example, the operator 12 determines whether there is interference between a clamp moving and the location of a column of the manufacturing plant. If the workcell design is good, the method advances to block 122 to be described.

In diamond 120, if the workcell design is not good or correct, the method returns to block 116 and block 108, previously described, to adjust the description of the workcell design by the workcell design system in the design engineering source 16. The method then advances to block 118 previously described. It should be appreciated that the information is imported and exported from the systems within the design engineering source 16.

If no workcell components are required as determined in diamond 114 or the workcell design is good or acceptable as determined in diamond 120, the method advances to block 122 and imports the data of the mechanical fixture design and/or data of the workcell design for block 124. In block 124, the method selects a controls design from the design engineering source 16. For example, the operator selects the controls to be used for the manufacturing line. The controls design includes a hardware design, template designation, PLC addressing, and PLC logic. After block 124, the method advances to block 126 and exports the information of the controls design. The method advances to diamond 128 and determines whether the controls design is good or acceptable. For example, the operator 12 determines whether there is interference between a clamp moving and the location of a column of the manufacturing plant. If the controls design is good, the method advances to block 130 to be described. It should be appreciated that the controls design system allows the operator 12 to describe all the sequence constraints that need to be met prior to allow the execution of each sequence segment.

In diamond 128, if the controls design is not good or correct, the method returns to block 122 and block 124, previously described, to adjust the description of the controls design by the controls design system in the design engineering source 16. The method then advances to block 126 previously described.

If the controls design is good or acceptable as determined in diamond 128, the method advances to block 130 and imports the data of the controls design and advances to block 132. Further, the method may advance directly from either block 106 or block 108 to block 132. For example, the method may advance from block 106 with fabrication data of the mechanical fixture design or three dimensional (3D) simulation data of the mechanical fixture design for simulation in the virtual programmable logic control verification simulator 22. In another example, the method may advance from block 108 with fabrication data of the workcell design or three dimensional (3D) simulation data of the workcell design for simulation in the virtual programmable logic control verification simulator 22.

In block 132, the method receives data or information and selects the controls simulation for the virtual programmable logic control verification simulator 22. The controls simulation includes human machine interface (HMI) design, logic verification, and three-dimensional simulation. For example, the operator 12 imports control data, pre-populates the control design project, builds process models, adds HMI's, connects logic to VPLC, and runs or executes VPLC simulation in the VPLC verification simulator 22 to verify control system design intent.

From block 132, the method advances to diamond 134 and determines whether the controls design is validated by executing or running the VPLC simulation in the VPLC verification simulator 22 to verify control system design to intent. For example, the operator 12 interacts with the simulation to test control design for intent and recovery (manual modes, disable sensors, etc.) such as line capability to design criteria, product to manufacturing line compatibility, manufacturing line optimization relative to part flow, and manufacturing line fit to manufacturing plant layout. If the controls design is validated, the method advances to diamond 136 to be described.

In diamond 134, if the controls design is not validated or correct, the method returns to block 130 and block 132, previously described, to adjust the controls simulation in the VPLC verification simulator 22. The method then advances to diamond 134 previously described. It should be appreciated that the information is imported and exported from the systems within the design engineering source 16.

If the controls design is validated, the method advances to block 136 and the method proceeds with the machine build. The machine build includes tool construction, assembly, controls, and run. It should be appreciated that the same PLC logic file used by the VPLC verification simulator 22 will be used for the machine build.

From block 136, the method advances to diamond 138 and determines whether to run off the machine build. For example, the operator 12 determines whether the machine build is good or acceptable by loading the VPLC validated PLC logic file into physical PLC hardware and executing machine functions by having PLC exchange input and output (I/O) information based on the status of the machine and the corresponding result of the PLC logic. The operator 12 continues to determine whether the machine build is good or acceptable by performing interrupts and introducing non-normal events to test the robustness of the control design to be able to recover from unexpected conditions such as faulting a part presence switch to test if the PLC logic instructs the machine to react in a correct manner. Other typical run off tests include failing limit switches, hitting emergency stops in mid-cycle, changing robot modes from auto-repeat to teach move in mid-cycle, etc. If the machine is determined to be run off, the method advances to bubble 140 and production is performed by the machine build.

In diamond 138, if the machine build is not to be run off, the method returns to block 136 previously described to adjust the machine build. The method then advances to diamond 138 previously described.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of designing a control system and using data from a design of the control system to enable programmable logic control verification simulation of programmable logic controller code for the control system, said method comprising the steps of:

constructing at least one mechanical fixture design, workcell design, and a controls design using a computer;

exporting mechanical fixture data from the mechanical fixture design, workcell data from the workcell design, and control data from the controls design and aligning the mechanical fixture data, workcell data, and control data with each other using the computer to be useable by a virtual programmable logic control (VPLC) verification simulator; and executing a VPLC simulation with the VPLC verification simulator using the mechanical fixture data, workcell data, and control data with the computer to verify the mechanical fixture design, the workcell design, and the controls design meet an intent of a design for the control system.

2. A method as set forth in claim 1 including a step of determining whether the mechanical fixture design is good.

3. A method as set forth in claim 2 including a step of changing the mechanical fixture design if the mechanical fixture design is not good.

4. A method as set forth in claim 1 wherein said step of constructing the mechanical fixture design comprises receiving information of a mechanical sequence, motion files, and tessellated geometry from a design engineering source.

5. A method as set forth in claim 1 including a step of determining whether the workcell design is good.

6. A method as set forth in claim 5 including a step of changing the workcell design if the workcell design is not good.

7. A method as set forth in claim 1 wherein said step of constructing the workcell design comprises receiving information of a mechanical sequence, motion files, tessellated geometry, and sensors from a design engineering source.

8. A method as set forth in claim 1 including a step of determining whether the controls design is good.

9. A method as set forth in claim 8 including a step of changing the controls design if the controls design is not good.

10. A method as set forth in claim 1 wherein said step of constructing the controls design comprises an operator selecting a hardware design, template designation, PLC addressing, and PLC logic from a design engineering source.

11. A method as set forth in claim 1 wherein said step of executing the virtual programmable logic control (VPLC) simulation with the VPLC verification simulator includes receiving the mechanical fixture design, the workcell design, and the controls design.

12. A method as set forth in claim 11 wherein said step of executing further comprises executing the virtual programmable logic control (VPLC) simulation with the VPLC verification simulator based on the mechanical fixture design, the workcell design, and the controls design.

13. A method as set forth in claim 1 including a step of determining whether the controls design is validated.

14. A method as set forth in claim 13 including a step of changing the controls design if the controls design is not validated.

15. A method as set forth in claim 13 including a step of constructing a machine build comprising selecting a tool construction, assembly, controls, and run.

16. A method as set forth in claim 15 including a step of determining whether the machine build is to be performed.

17. A method as set forth in claim 16 including a step of changing the machine build if the machine build is not to be performed.

18. A method of designing a control system and using data from a design of the control system to enable programmable logic control verification simulation of programmable logic controller code for the control system, said method comprising the steps of:

constructing at least one mechanical fixture design, workcell design, and controls design using a computer;

exporting mechanical fixture data from the mechanical fixture design, workcell data from the workcell design, and control data from the controls design and aligning the mechanical fixture data, workcell data, and control data with each other using the computer to be useable by a virtual programmable logic control (VPLC) verification simulator;

executing a VPLC simulation with the VPLC verification simulator using the computer based on the mechanical fixture data, workcell data, and control data of the mechanical fixture design, the workcell design, and the controls design to verify the mechanical fixture design, the workcell design, and the controls design meet an intent of a design for the control system; and constructing a machine build based on the verified mechanical fixture design, the workcell design, and the controls design.

19. A method as set forth in claim 18 including a step of determining whether the mechanical fixture design is good.

20. A method as set forth in claim 19 including a step of changing the mechanical fixture design if the mechanical fixture design is not good.

21. A method as set forth in claim 18 including a step of determining whether the workcell design is good.

22. A method as set forth in claim 21 including a step of changing the workcell design if the workcell design is not good.

23. A method as set forth in claim 18 including a step of determining whether the controls design is good.

24. A method as set forth in claim 23 including a step of changing the controls design if the controls design is not good.

25. A method as set forth in claim 18 including a step of determining whether the controls design is validated.

26. A method as set forth in claim 25 including a step of changing the controls design if the controls design is not validated.

27. A method as set forth in claim 18 including a step of determining whether the machine build is to be performed.

28. A method as set forth in claim 27 including a step of changing the machine build if the machine build is not to be performed.

* * * * *